United States Patent [19]

Eichweber

[11] 4,247,858
[45] Jan. 27, 1981

[54] ANTENNAS FOR USE WITH OPTICAL AND HIGH-FREQUENCY RADIATION

[76] Inventor: Kurt Eichweber, Holsteiner Chaussee 379/381, 2000 Hamburg 61, Fed. Rep. of Germany

[21] Appl. No.: 40,700

[22] Filed: May 21, 1979

[51] Int. Cl.$^3$ .................. H01Q 13/10; G02B 5/14
[52] U.S. Cl. ................... 343/729; 343/721; 343/771; 250/227; 350/96.10
[58] Field of Search .............. 343/6 ND, 720, 721, 343/771, 840, 725, 729, 730; 350/96.10; 250/227

[56] References Cited

U.S. PATENT DOCUMENTS

| | | | |
|---|---|---|---|
| 2,423,648 | 7/1947 | Hansell | 343/840 |
| 3,482,248 | 12/1969 | Jones | 343/771 |
| 3,683,379 | 8/1972 | Saddler et al. | 343/721 |

Primary Examiner—Eli Lieberman
Attorney, Agent, or Firm—Arnold, White & Durkee

[57] ABSTRACT

Disclosed is an antenna for use in transmitting and/or receiving both optical, including infrared, and high-frequency electro-magnetic radiation. The antenna is comprised of a hollow conductor in the interior of which is arranged a light conductor as a dielectric. Arranged in the wall of the hollow conductor is at least one slot which acts as an input and/or output coupling opening for the hollow conductor and as an inlet and/or outlet window for optical radiation. Also disclosed is an antenna assembly unit consisting of a plurality of the individual antennas arranged to give omni-directional capabilities for receiving and transmitting of optical and high-frequency electro-magnetic radiation.

14 Claims, 4 Drawing Figures

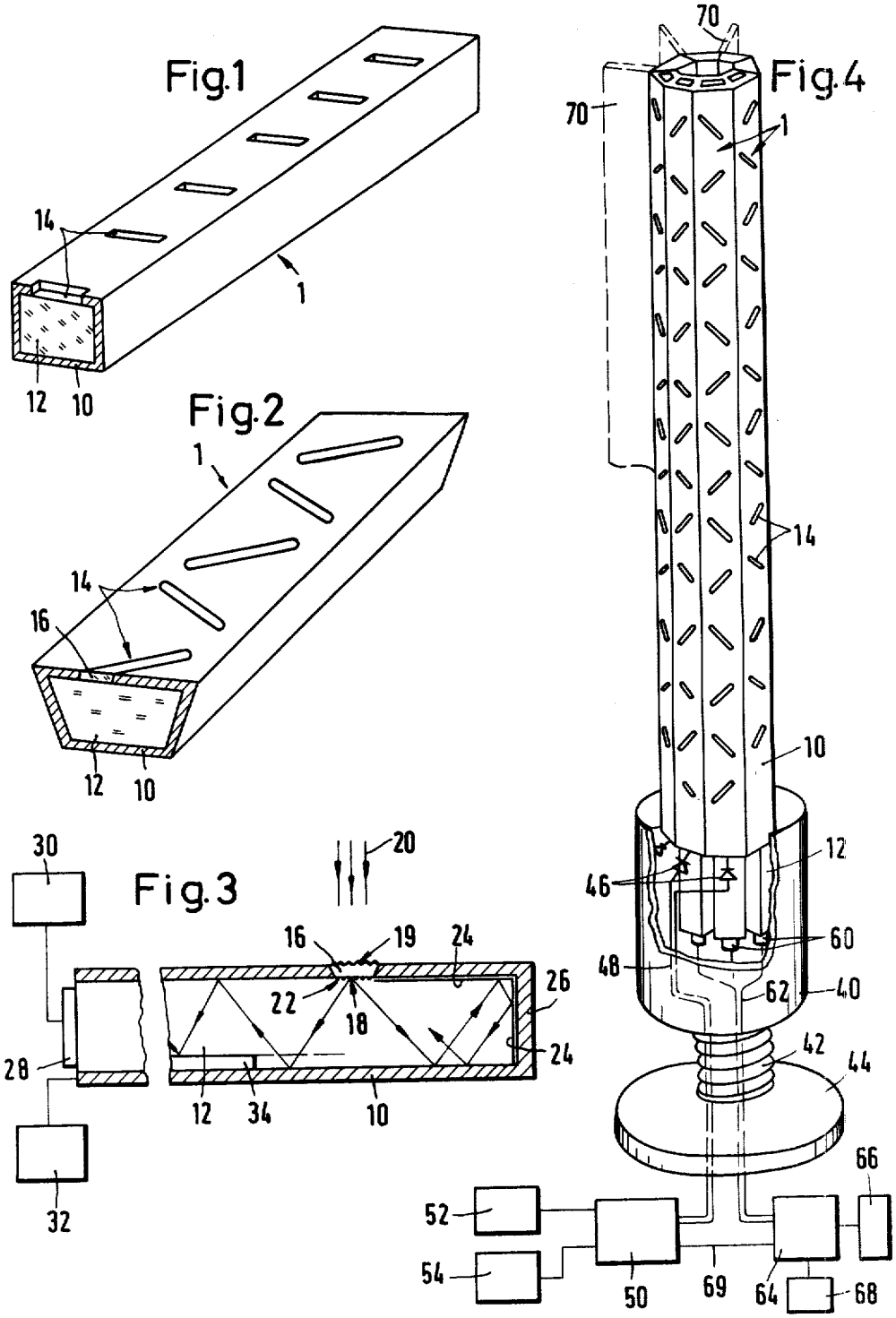

ANTENNAS FOR USE WITH OPTICAL AND HIGH-FREQUENCY RADIATION

BACKGROUND OF THE INVENTION

This invention relates to an antenna for transmitting and/or receiving electro-magnetic radiation, from the infrared and visible range of wavelengths to the radar and microwave wavelengths. For purposes of this application the term optical radiation will be used to refer to the electro-magnetic radiation in the visible and infrared spectrum while the terminology high frequency electro-magnetic radiation will be used to identify radiation in the range of centimeter or millimeter wavelengths, such as radar and microwaves. These antennas may be used in the military field.

Modern, well equipped armies increasingly need to provide their armoured vehicles and other battle participants with devices for receiving and/or transmitting laser radiation, particularly in the infrared range, as well as radar radiation. Devices for laser and radar warning, e.g. warning of incoming airplanes which make use of radar fire control, or warning of battle field surveillance radar, are practically indispensable. Fire control radar for artillery must also be able to be detected, preferably with detection of the arrival direction, in order to gain reaction time when a risk is in the offing. Facility for detection as well as emission of infrared types of signal is likewise necessary because infrared fire searchlights, laser target illuminators, laser range-finders, and laser interrogation signals for friend/foe recognition (IFF) are used on the battlefield. Laser transmission paths for communication and laser weapon simulators used for the purposes of practice and training are also desirable.

Communication between units which may move freely and independently in the battlefield is important. The hopeless overcrowding of the militarily usable wireless frequency signals demands escape solutions for direct communication on the battlefield. Therefore increased utilization of radar and laser frequency bands for short communication paths with free optical sight is necessary. For this purpose, microwave signals in the centimeter and millimeter range, as well as laser signals of wave lengths from 0.9 to approximately 2 microns ($\mu$) for example are of interest. Furthermore, for reasons of energy, as well as for avoiding the risk of interception, it is advantageous in many cases to be able to directionally transmit and receive in each sector.

Heretofore, transmitting and receiving devices for optical signals and for radar signals have been constructed fundamentally separate from each other. This has disadvantages because of space requirements, and because of the difficulty of finding suitable locations for attachment of the equipment. For example, on an armoured vehicle, the difficulty in locating the transmitting and receiving devices arises because of the need to protect the devices as much as possible from damage and yet to place them so that the emission and/or reception of signals in largely unimpeded. When the transmitting and/or receiving device must additionally have a directional characteristic or with a freely selectable transmission and/or reception direction, the realization of a usable device with the means known heretofore is even more difficult. For example, the rotatable parabolic antennas known in the art and used for radar reception are too heavy, too expensive and too sensitive for military use. Moreover, while such antennas admittedly have a directional characteristic, they must be swung or continuously rotated for the reception of signals coming from any desired direction and for the reply thereto in the same direction. Furthermore, these antennas are unsuitable for the reception of modern pulse-coded signals, since the adjustment periods necessary for this purpose are longer by orders of magnitude than the duration of such signals.

PRIOR ART STATEMENT

This prior art statement is made pursuant to 37 C.F.R. section 1.97–1.99.

Apart from the prior art background generally referred to in the specification of this application, the applicant is not aware of any particular prior art references such as patent specifications or of articles disclosing this prior art.

In accordance with the continuing duty of candor and disclosure required by the Patent and Trademark Office, the Office will be informed if and when any relevant prior art is discovered.

SUMMARY OF THE INVENTION

According to the invention, an antenna is provided for use in the transmitting and/or receiving of optical and high-frequency electro-magnetic radiation, comprising a hollow conductor in the interior of which a light conductor is arranged as dielectric. The hollow conductor has in its wall at least one opening, such as a slot, for the purpose of acting as an input and/or output coupling opening of the hollow conductor and as an inlet and/or outlet window for optical radiation through the light conductor.

A hollow conductor with at least one slot constitutes a so-called slot antenna, as is known from high-frequency engineering. Slot antennas may exhibit a satisfactory directional characteristic with suppression of side lobes resulting from their manner of construction, that is, by providing a plurality of slots on only one face of the hollow conductor, and by appropriately arranging and forming the slots. Slot antennas are employed already, for instance, in Doppler radar apparatus for aerial navigation, fire control radar, and the like. Such a slot antenna may now be combined with an antenna for optical radiation in such a manner that radar radiation impinging on a slot is coupled into the hollow conductor and propagated therein, whereas optical radiation, e.g. laser radiation, impinging on the same slot is coupled into and propagated by the light conductor arranged within the hollow conductor. Conversely the same applies for the emission of radiation. In this way, a very compact and robust antenna for both kinds of radiation may be produced which takes up little room and can be easily attached to equipment such as an armoured vehicle, in the manner of a conventional rod antenna. Furthermore, it is a significant feature of this invention that with a single antenna signals such as in the form of infrared laser light and radar may be simultaneously interrogated, or transmitted, or that one may be transmitted while the other is being received.

The slots, as the sources for the arrival and/or departure of the radiation, may be distributed over the entire length of the antenna, so that the transmitting and/or receiving properties of the antenna are less likely to be adversely affected by soiling, accidental covering by plants, vehicle parts and the like.

The light conductor arranged in the hollow conductor may consist of a solid state material such as a quartz rod. The light conductor may also consist of a liquid, in which case the slots may be sealed by means of radiation permeable windows. The light conductor may also consist of a bunched arrangement of individual light conducting filaments or tapes, each of which terminates at one of the slots. This latter arrangement would permit selective control of the receiving and transmitting of optical radiation from the individual slots. In the region of the slots, optical measures are provided to assure that a significant amount of the optical radiation is diverted in direction such that it more optimally proceeds along the axial direction of the conductor. One convenient manner of accomplishing this result is by roughening or oblique grinding of the light conductor or of the radiation permeable windows.

As mentioned before, a good directional characteristic for both the high-frequency and optical radiation may be obtained by providing the slots in only one side of the hollow conductor, such as on only one face of a rectangular hollow conductor.

A plurality of the antennas, as hereinbefore described, may be assembled to form a unit such that radiation can be received from and/or transmitted to any direction without movement or rotation of the antenna. In this unit, each individual antenna, again constructed as a hollow conductor, with slots arranged on only one face of the conductor and having a light conductor arranged within the interior space of the hollow conductor, is associated with a defined angular sector, with the total unit covering a full 360° circle. The arrival direction of the received optical or high-frequency radiation can be detected and/or the emission of the optical or high-frequency rotation can be aimed in particular directions by selective interrogation or energization of the individual antennas. These functions can be accomplished during short interrogation or adjustment periods inasmuch as the unit need not be rotated or moved. Furthermore, this antenna assembly unit permits simultaneous multi-directional interrogation and transmission of signals.

BRIEF DESCRIPTION OF THE DRAWINGS

The invention will be further described, by way of example, with reference to the accompanying drawings, in which:

FIG. 1 illustrates in perspective view a rectangular antenna with a possible slot arrangement in accordance with this invention;

FIG. 2 illustrates in perspective view a trapezoid antenna with a zig-zag slot arrangement in accordance with this invention;

FIG. 3 illustrates a longitudinal cross-section of an antenna in accordance with this invention; and FIG. 4 illustrates diagrammatically in perspective representation an antenna assembly in accordance with this invention which has a selectively controllable directional characteristic.

DETAILED DESCRIPTION

FIG. 1 illustrates a section of a rod-shaped antenna which consists of a hollow conductor 10, made of copper, for example, and formed with a rectangular cross-section. The continuous inner space of the hollow conductor is completely filled with a material 12 which is transparent to "optical" radiation, such as infrared radiation, and which has a homogeneous dielectic constant. This material 12 consists of a solid-state material with a refractive index $n > 1$, such as acrylic resin, epoxy resin, glass, or quartz, and constitutes a light conductor. On one side, the hollow conductor 10 has slots 14 arranged in its wall at regular spacings. The surface of the transparent material 12 is exposed in the regions of these slots.

In the embodiment shown in FIG. 2, the hollow conductor 10 has a trapezoidal cross-section. Furthermore, the slots 14 are not arranged transverse to the rod axis, but inclined thereto in a "zig-zag" manner. In this case, the light-conducting transparent material 12 within the hollow conductor consists of a liquid with a suitable refractive index. Each slot 14 is sealed by a window 16 permeable to the optical radiation. Suitable materials for this purpose are artificially or naturally mixed crystals and mono-crystals, e.g. strips of synthetic sapphire, germanium and the like.

FIG. 3 illustrates a diagrammatic longitudinal section through an antenna rod according to FIG. 1 or 2. In the region of the slot 14 of the hollow conductor 10, the light-conducting transparent material 12 and/or the window 16 (when present) filling the slot 14 has a roughened surface 18 or 19. This has the effect of dispersing the optical radiation 20 impinging in the transverse direction of the antenna rod and thereby partly diverting the radiation into a direction inclined to the rod axis. The sharp-edged construction of the slot 14 walls as indicated at 22 also contributes to such diverting of the optical radiation. At one end of the transparent light-conducting material 12, a layer 24 is provided which reflects the optical radiation. This layer is deposited either on the light conductor 12 or on the inside of a wall 26 which closes the hollow conductor 10. The wall 26 may be part of the hollow conductor 10 or may be insulated therefrom or consist of an insulating material. The side faces of the light-conducting transparent material 12 or the inner faces of the hollow conductor 10 may also be provided with a coating which reflects the optical radiation. However, the sufficiently high refractive index of the light-conducting material 12 will generally be enough to ensure that the optical radiation which is partly diverted from the transverse direction to the axial direction of the antenna rod will be propagated by total reflection in the axial direction of the light conductor 12, in accordance with the arrows shown, to the end of the antenna rod. At the end of the antenna rod, the optical radiation is received by an optical sensor 28, such as a photo diode, and can be fed to a detector device 30. Likewise at this end, a transmission device 32 for coupling high-frequency electro-magnetic waves in the centimeter (cm) or millimeter (mm) range may be provided at the hollow conductor 10. This high-frequency radiation, which is propagated in the axial direction of the hollow conductor, is uncoupled at the slots 14 and radiated in a direction perpendicular to the antenna rod. Obviously, in place of the sensor for optical radiation, a generator for optical radiation, such as a laser, may be connected to the end of the light-conducting material, so that this optical radiation is emitted through the slots 14. Similarly, in place of the transmitter 32 for high-frequency electro-magnetic radiation, a receiver for radar radiation or the like received at the slots 14 may be coupled thereto. The coupling of the sensing devices or transmission devices may be made in the center or at both ends of the antenna rod instead of at just one end.

In place of a light-conducting transparent material 12 with a refractive index which is homogeneous over the whole cross-section, a light conductor may be used which comprises at its edge region a layer 34 which has a lower refractive index (except in the region of the slots 14), so that the propagation of the optical radiation in a direction inclined to the rod axis may be effected by total reflection at this edge layer 34. For example, a quartz rod with a refractive index n=1.5 may be coated with a material with a lower refractive index, e.g. n=1.3. This technique is generally known for filamentary light conductors.

A preferred method of producing an antenna rod according to FIGS. 1 to 3 consists of depositing the hollow conductor in the form of a metal layer directly on the light conducting rod. According to this method, an optically polished quartz rod, for instance, is chosen with a cross-section which corresponds to the desired adjusted hollow conductor dimension for the desired wavelength range. The quartz rod is first chemically treated to be conductive for the galvanizing treatment, and is then coated with a material such as silver or gold or another material which will satisfactorily reflect the desired optical wavelength. An additional thick-walled coating with nickel and/or copper then produces the "crude" body of the hollow conductor in which the slots may be produced, for example by milling. However, the slots may also be formed by a photoetching process or by partial covering during the galvanizing process. The slots are dimensioned according to the radar frequency which is to be received or transmitted.

An antenna rod according to FIGS. 1 to 3, which has slots 14 disposed about only one of the rectangular sides, has a directional characteristic towards the slotted side. The width of the transmission or reception lobe and the suppression of the lateral lobes for the radar frequency as well as for the optical frequency can be influenced by appropriate configuration and arrangement of the slots.

As shown in FIG. 4, an antenna with all-round directional characteristic and selective control of the individual angular sectors may be formed from a plurality of antenna rods. As shown in FIG. 4, eight antenna rods 1, each consisting of a hollow conductor 10, light conductor 12 and slots 14, are combined to form an antenna assembly unit in such a manner that each antenna rod 1 is associated with a defined angular sector. The antenna rods 1 may have a trapezoidal cross-section corresponding to FIG. 2, so that they fit together without gaps. However, rectangular antenna rods according to FIG. 1, or rods of any other shape may be used and the resulting gaps may be filled with a suitable material. The whole assembly may also be enclosed by an outer covering or a tube of a material which is permeable to the two categories of radiation. This outer covering offers additional protection against the influence of the weather and damage. This assembly unit of the antenna rods 1 forms a rod-shaped antenna which is fixed at its foot in a holder 40 which is connected to a base plate 44 by means such as a spring 42 and/or a universal joint. The base plate may be fixed to an armoured vehicle or the like, in the manner of a conventional rod antenna. Within the holder or mounting 40, each individual hollow conductor 10 is connected by means of a suitable coupling element 46 to a lead 48, and the leads 48 of all the hollow conductors 10 are guided through the holder to a control device 50 by means of which each individual hollow conductor 10 is selectively controllable. A receiver 52 for the radar or other high-frequency radiation and/or a generator 54 for radar or other high-frequency electro-magnetic emission may be connected to the control device 50.

Likewise, in the holder 40 the lower ends of the light conductors 12 which may be extended slightly beyond the hollow conductors 10, are connected to light receiving elements 60, such as photo diodes, each of which is connected by a lead 62 to a common control device 64 which in turn is connected to a receiving and evaluating apparatus 68.

This antenna assembly unit, as shown in FIG. 4, may be operated in such a manner that when optical radiation, such as infrared laser radiation, impinges thereon from any direction, it is received by a light conductor 12, which is associated with a particular angular sector, and is fed to a photo diode 60. A control device 64 detects the associated angular sector and indicates it on an indicator device 68, so that the operator of the antenna assembly unit receives a warning of the impinging radiation as well as an indication of the impact direction. If it is determined through the evaluation device 66 that the IFF interrogation of a friendly vehicle is involved, the control drive 64 can activate the control device 50 by way of a connecting lead 69 in such a manner that the same antenna rod 1 which received the impinging radiation is then energized with a radar transmission signal produced by the transmitter 54. This signal is then transmitted as a radar reply signal issuing from the slots 14 in exactly the same direction from which the interrogation signal was received. In this manner communication is possible between combat units or combat participants in a narrow angular sector, and the risk of detection by the enemy or interception of this communication is substantially reduced. Obviously the control device 50 may be constructed similar to the control device 64, so that it effects a warning of radar radiation impinging from any direction, with corresponding indication of the impact direction on the receiving device 52.

The directional characteristic of the antenna according to FIG. 4 for optical radiation may be further improved by attaching screening strips of conductive or preferably non-conductive material, as indicated at 70 by broken lines. The screening strips project radially from the antenna and separate the angular sectors associated with the individual antenna rods.

It will be apparent that modifications and variations of the subject matter disclosed herein may be effected without departing from the spirit or the scope or my invention. It is not my intention in setting forth the specific embodiments and examples which I have herein disclosed to limit in any way the legitimate scope of my patent rights, as these have been included only to meet the statutory requirements of specific disclosure. Rather, I intend that the following claims be interpreted to the full extent permitted by law.

What is claimed is:

1. A rod-type antenna, for use in transmitting and/or receiving optical and high-frequency electro-magnetic radiation, comprising:
   an elongated hollow conductor, having formed in its wall at least one slot-shaped opening as an input and/or output coupling opening for high-frequency electro-magnetic radiation;
   at least one elongated dielectric light conductor extending within and along the interior space of the hollow conductor and being optically coupled to the slot-shaped opening for transmitting and/or receiving optical radiation;

a first coupling means at one end of the hollow conductor for operably coupling the hollow conductor to a transmitter and/or receiver for high-frequency electro-magnetic radiation; and a second coupling means at one end of the hollow conductor for optically coupling the light conductor to a transmitter and/or receiver for optical radiation.

2. The antenna of claim 1, further comprising an optical means in the region of the slot-shaped opening for diverting an increased portion of the optical radiation into the axial direction of the light conductor.

3. The antenna of claim 1, wherein the light conductor is comprised of a solid-state material.

4. The antenna of claim 3, wherein the surface of the light conductor in the region of the slot-shaped opening is roughened for the purpose of diverting an increased portion of the optical radiation into the axial direction of the light conductor.

5. The antenna of claim 1, wherein the light conductor is comprised of a liquid and the slot-shaped opening of the hollow conductor is provided with a liquid-tight cover which is permeable to the optical radiation.

6. The antenna of claim 5, wherein the surface of the permeable, liquid-tight cover of the slot-shaped opening is roughened for the purpose of diverting an increased portion of the optical radiation into the axial direction of the light conductor.

7. The antenna of claim 1, wherein the light conductor inside the hollow conductor is surrounded by a reflecting layer except in the region of the slot-shaped opening.

8. The antenna of claim 1, wherein the hollow conductor is constructed as a coating of the light conductor.

9. The antenna of claim 1, wherein the walls of the slot-shaped opening are constructed so as to slant toward the center of the slot-shaped opening such that a sharp edge abuts against the light conductor for the purpose of increasing the diversion of the optical radiation into a direction inclined to the longitudinal axis of the light conductor.

10. The antenna of claim 1, wherein the hollow conductor has a plurality of slot-shaped openings distributed over the length.

11. An antenna assembly unit comprised of a plurality of the antennas of claim 1, collectively arranged such that each antenna is associated with an angular sector for reception and/or transmission of radiation.

12. The antenna assembly unit of claim 11, wherein the conductors of the individual antennas are arranged to be selectively individually controlled and interrogated.

13. The antenna assembly unit of claim 12, wherein the conductors are further arranged to be selectively controlled and interrogated in common.

14. The antenna assembly unit of claim 11, further comprising screening strips attached to the antenna assembly unit and projecting radially from the antenna assembly unit to separate the angular sectors associated with the individual antenna rods.

* * * * *